Feb. 12, 1924. 1,483,222

J. W. GALLOWAY

AUTOMOBILE ANTITHEFT DEVICE

Filed Aug. 20, 1920

Inventor
Joseph Walter Galloway

By Joshua R. H. Potts
Attorney

Patented Feb. 12, 1924.

1,483,222

UNITED STATES PATENT OFFICE.

JOSEPH WALTER GALLOWAY, OF WILMINGTON, DELAWARE.

AUTOMOBILE ANTITHEFT DEVICE.

Application filed August 20, 1920. Serial No. 404,835.

*To all whom it may concern:*

Be it known that I, JOSEPH WALTER GALLOWAY, a citizen of the United States, residing at Wilmington, county of New Castle, and State of Delaware, have invented certain new and useful Improvements in Automobile Antitheft Devices, of which the following is a specification.

My invention relates to devices for preventing the theft of automobiles, and particularly to a device for this purpose wherein an audible alarm is sounded when an unauthorized person attempts to drive the car.

The object of my invention is to provide a device which may be readily attached to one of the wheels of an automobile, which will make it practically impossible to drive the car, and further characterized by means for sounding an alarm should any one attempt to drive the car while the device is in position. A further object of my invention is to provide a device as mentioned in which the alarm is made by detonating a cartridge or other explosive within the device. A further object of my invention is to provide a device as mentioned of such construction that the same cannot be turned or displaced on the wheel to render it inoperative. A further object of my invention is to provide in a device as mentioned means for adjusting the detonating mechanism. A further object of my invention is to provide various means for preventing tampering with the several parts of the device. A further object of my invention is to provide a device of the character mentioned equipped with means to prevent the device from marring the felly of the wheel. Other objects will appear hereinafter.

With these objects in view my invention consists generally in a housing adapted to receive an explosive charge and means for detonating the same, and means for securing the same upon a periphery of a wheel so that contact of the device with the ground will cause the charge to be detonated. My invention consists further in a device as mentioned in which the detonating mechanism comprises a spring retracted element and means for adjusting the same. My invention further consists in a device as mentioned in which said housing is provided with an open side to facilitate inserting the explosive charge and adjusting the detonating mechanism, in combination with a closure for the housing, means for securing the same in closed position and means to prevent tampering with the same. My invention further consists in a device as mentioned in which the attaching means comprises a pair of hingedly connected members, one of which is preferably integral with the housing, and means for locking said members in clamping position about the tire, rim and felly of the wheel. My invention further consists in a device as above mentioned in combination with means to prevent the clamping members from marring the felly. My invention further consists in various details of construction and arrangements of parts all as will be fully described hereinafter and particularly pointed out in the claims.

My invention will be more readily understood by reference to the accompanying drawings forming a part of this specification and in which—

Fig. 1 is an elevation of a device embodying my invention, portions being illustrated in section and the housing closure being illustrated in open position, Fig. 2 is a side elevation with the housing shown in section, the section being taken on the line 2—2 of Fig. 1, Fig. 3 is a transverse section on the line 3—3 of Fig. 1, Fig. 4 is a detail view of the detonating mechanism upon an enlarged scale, and Fig. 5 is a section on the line 5—5 of Fig. 1.

Referring now to the drawings 1 and 2 comprises clamping members adapted to embrace the tire, rim and felly of an automobile wheel, and hingedly connected as at 3. The portions of the members 1 and 2 which contact the felly and rim are lined with a suitable material 4 to prevent marring these portions of the wheel. The material 4 extends over the edges of the members 1 and 2 and is secured in place by metal strips 5 held in position preferably by countersunk screw 6. The members 1 and 2 are shaped to conform substantially to the felly, rim and tire of the wheel so that the device cannot be maliciously turned out of operative position even upon deflation of the tire.

Upon the member 1, and preferably integral therewith is a housing 7. This is preferably pyramidal in form and comprises a back wall 8 and converging side walls 9—9 leaving one side of the housing open. A pair of transverse partitions 10 and 11 are arranged within the housing for purposes hereinafter described. 12 indicates a closure for the open side of the housing hingedly mounted as at 13 and provided with a lock 14, the bolt 15 of which is adapted to engage behind a boss or rib 16, preferably arranged between the partitions 10 and 11. The edges of the closure 12 are provided with inturned flanges 17 adapted to extend into the housing when the closure is in operative position and to prevent an instrument being inserted between the closure and the housing, either to tamper with the lock 14 or with the alarm mechanism hereinafter described.

The ends of the members 1 and 2 terminate under the housing 7, the ends thereof abutting as indicated in Fig. 1, and the member 1 is provided with a tongue 18 adapted to extend into a socket 19 in the member 2. The tongue 18 and the adjacent portion of the member 2 are provided with registering apertures 20 and 21 through which is extended a locking pin 22. This preferably comprises a thumb screw extending through the apertures 20 and 21 and tapped into the member 2 as at 23. This locking pin is inserted from within the housing so that the same is protected by the closure 12 from being tampered with.

The partition 11 is provided with an aperture 24 to receive a detonating charge such as a cartridge 25. Arranged in alignment with the cartridge, and extending loosely through the partition 10 and an aperture in the end 26 of the housing is a plunger 27, upon the inner end of which is arranged a firing pin 28. The plunger terminates in a head 29 which, upon contact with the ground forces the firing pin inwardly, thereby detonating the cartridge 25. The head 29 is preferably coextensive in width with the end of the housing so as to insure operation of the device.

The plunger 27 is threaded as at 30, and threaded upon the same is a washer 31. Interposed between said washer and a seat 32 in the partition 10 is a spring 33 for normally retracting the plunger. It is obvious that by adjusting the washer 31 the tension of the spring may be regulated. A cotter pin 34 extends through the plunger below the partition 10 and prevents withdrawal of the plunger. The plunger is provided with a bore 35 into which the firing pin is threaded, with a knurled collar 36 whereby it may be adjusted. The pin is provided also with a longitudinally disposed slot 37 through which the cotter pin 34 extends, locking the pin in adjusted position.

The operation of the device is as follows:

The clamping arms 1 and 2 are arranged about the tire, rim and felly of the wheel, with the housing 7 projecting outwardly. The locking pin 22 is then inserted, locking the members 1 and 2 in position, a cartridge having already been placed in position; and closure 12 is closed and locked. Should an unauthorized person attempt to drive the car the projecting housing 7 will render the driving difficult, but as soon as the head 29 of the plunger strikes the ground the firing pin will be thrust against the cartridge detonating the same, and giving an alarm.

I claim:—

1. A device of the class described comprising a pair of clamping members adapted to be secured about the felly and tire of a wheel, an outwardly projected housing on one of said members, locking means for said members within said housing, said housing being open at one side, a closure for the open side of said housing, said locking means being accessible only through said open side when said closure is opened, and a lock for said closure substantially as described.

2. A device of the class described comprising a pair of hingedly connected clamping members adapted to embrace the felly and tire of a wheel, the adjacent faces of the free ends of said members being provided with a co-operating tongue and socket, respectively, an outwardly projecting housing on one of said members and covering the outer ends of both members, a locking pin for said members arranged within said housing and projecting through said tongue and socket, and a closure for said housing, substantially as described.

3. A device as set forth in claim 1 in combination with means on said closure to prevent tampering with the interior of said housing, substantially as described.

4. A device as set forth in claim 1 in which the said housing comprises a pyramidal member open upon one side, a closure for said open side, means within said housing for supporting a detonating charge and a plunger extending inwardly from the end of said housing and adapted when driven inwardly to detonate said charge, substantially as described.

5. A device of the class described comprising a pair of clamping members adapted to be secured about the felly and tire of a wheel, an outwardly projecting pyramidal housing on one of said members, said housing being open at one side and provided with a pair of transverse partitions, a closure for the open side of said housing, one of said partitions being provided with an aperture to receive a cartridge, a plunger extending through the outer end of said housing and the adjacent partition in alinement with said aperture, a washer threaded on said plunger, a spring interposed between said washer and said partition, and a fire pin adjustably mounted in the end of the plunger, substantially as described.

In testimony whereof I have signed my name to this specification in the presence of two subscribing witnesses.

JOSEPH WALTER GALLOWAY.

Witnesses:
 JOHN L. WRIGHT,
 WILLIAM W. DOUTY.